(12) United States Patent
Billings et al.

(10) Patent No.: US 11,237,323 B2
(45) Date of Patent: Feb. 1, 2022

(54) METHODS AND SYSTEMS FOR CONTROLLING AIR FLOW THROUGH AN ANNEALING FURNACE DURING OPTICAL FIBER PRODUCTION

(71) Applicant: Corning Incorporated, Corning, NY (US)

(72) Inventors: Kenneth Duane Billings, Wilmington, NC (US); Spencer Thomas Kingsbury, Wilmington, NC (US); Robert Clark Moore, Wilmington, NC (US); Michael James Todt, Wilmington, NC (US); Johnnie Edward Watson, Hampstead, NC (US)

(73) Assignee: Corning Incorporated, Corning, NY (US)

( * ) Notice: Subject to any disclaimer, the term of this patent is extended or adjusted under 35 U.S.C. 154(b) by 1019 days.

(21) Appl. No.: 15/899,558

(22) Filed: Feb. 20, 2018

(65) Prior Publication Data

US 2018/0246274 A1 Aug. 30, 2018

Related U.S. Application Data

(60) Provisional application No. 62/464,791, filed on Feb. 28, 2017.

(51) Int. Cl.
*C03B 25/10* (2006.01)
*G02B 6/028* (2006.01)
(Continued)

(52) U.S. Cl.
CPC .......... *G02B 6/028* (2013.01); *C03B 37/029* (2013.01); *C03B 37/02727* (2013.01); *C03B 2205/56* (2013.01)

(58) Field of Classification Search
CPC ....... C03B 37/029; C03B 37/10; C03B 37/15; C03B 25/10
See application file for complete search history.

(56) References Cited

U.S. PATENT DOCUMENTS 4,030,901 A * 6/1977 Kaiser .................. C03B 37/029
65/424
4,174,842 A * 11/1979 Partus .................. C03B 37/029
277/431

(Continued)

OTHER PUBLICATIONS

Leuptow et al; "Near-Wall Streaky Structure in a Turbulent Boundary Layer on a Cylinder"; American Institute of Physics; Phys. Fluids A, 3 (11), Nov. 1991; pp. 2822-2824.

(Continued)

*Primary Examiner* — Cynthia Szewczyk
(74) *Attorney, Agent, or Firm* — Kevin L. Bray (57) ABSTRACT

An optical fiber production system includes an annealing furnace having a furnace inlet, a furnace outlet, and a process tube extending between the furnace inlet and the furnace outlet, the process tube having a process tube wall and a heating zone including at least one heating element. The optical fiber production system also includes a gas distribution assembly fluidly coupled to the furnace outlet and structurally configured to induce gas flow from the gas distribution assembly into the process tube such that gas flows within the process tube in an upflow direction.

25 Claims, 5 Drawing Sheets

(51) Int. Cl.
*C03B 37/029* (2006.01)
*C03B 37/027* (2006.01)

(56) References Cited

U.S. PATENT DOCUMENTS

| | | | |
|---|---|---|---|
| 5,320,658 A * | 6/1994 | Ohga | C03B 37/02718 65/435 |
| 2002/0178762 A1 | 12/2002 | Foster et al. | |
| 2003/0041628 A1 * | 3/2003 | Bird | C03B 37/029 65/533 |
| 2003/0200772 A1 | 10/2003 | Foster et al. | |
| 2006/0191293 A1 * | 8/2006 | Kuczma | C03B 37/02727 65/384 |
| 2007/0022786 A1 * | 2/2007 | Foster | C03B 37/02718 65/384 |
| 2010/0107701 A1 | 5/2010 | Okada et al. | |
| 2018/0111871 A1 * | 4/2018 | Jewell | C03B 37/029 |

OTHER PUBLICATIONS

Schlichting; "Boundary Layer Theory"; 7th Edition, p. 463. New York: McGraw-Hill (1979).
Xiong et al; "An Experimental Study of the Cooling of a Thin Glass Fiber During the Formation Process"; Experimental Heat Transfer, 17, (1), 2004; 32 Pages.
International Search Report and Written Opinion PCT/US2018/019082 dated Jun. 6, 2018.

* cited by examiner

METHODS AND SYSTEMS FOR CONTROLLING AIR FLOW THROUGH AN ANNEALING FURNACE DURING OPTICAL FIBER PRODUCTION

This application claims the benefit of priority under 35 U.S.C. § 119 of U.S. Provisional Application Ser. No. 62/464,791 filed on Feb. 28, 2017 the content of which is relied upon and incorporated herein by reference in its entirety.

BACKGROUND

Field

The present specification generally relates to apparatuses and methods for producing optical fibers, and more particularly, to controlling air flow through an annealing furnace during an optical fiber production operation.

Technical Background

Conventional techniques and manufacturing processes for producing optical fibers generally include drawing an optical fiber downward from a draw furnace and along a linear pathway through multiple stages of production in an optical fiber draw tower. Once drawn from the draw furnace, the optical fiber may be annealed in an annealing furnace to slowly cool the optical fiber. When traversing the annealing furnace, gas flow patterns within the annealing furnace may alter the resultant properties of the optical fiber. Accordingly, a need exists for methods and systems to control and alter gas flow in the annealing furnace during optical fiber production.

SUMMARY

According to one embodiment, an optical fiber production system includes an annealing furnace having a furnace inlet, a furnace outlet, and a process tube extending between the furnace inlet and the furnace outlet, the process tube having a process tube wall and a heating zone including at least one heating element. The optical fiber production system also includes a gas distribution assembly fluidly coupled to the furnace outlet and structurally configured to induce gas flow from the gas distribution assembly into the process tube such that gas flows within the process tube in an upflow direction.

In another embodiment, a method of inducing gas flow in an annealing furnace includes translating an optical fiber within an annealing furnace along a draw pathway, the annealing furnace having a furnace inlet, a furnace outlet, and a process tube extending between the furnace inlet and the furnace outlet, the process tube having a process tube wall and a plurality of heating zones, each heating zone including at least one heating element. The method also includes inducing gas flow from a gas distribution assembly fluidly coupled to the furnace outlet of the annealing furnace into the process tube of the annealing furnace, such that gas flows within the process tube in an upflow direction.

In yet another embodiment, an optical fiber production system includes a draw furnace configured to draw an optical fiber from an optical fiber perform along a draw pathway extending from the draw furnace, and an annealing furnace positioned along the draw pathway. The annealing furnace includes a furnace inlet, a furnace outlet, and a process tube extending between the furnace inlet and the furnace outlet, the process tube having a process tube wall and a plurality of heating zones, each heating zone including at least one heating element. The optical fiber production system also includes a gas distribution assembly positioned along the draw pathway and fluidly coupled to the furnace outlet and structurally configured to induce gas flow from the gas distribution assembly into the process tube such that gas flows within the process tube in an upflow direction. Further, the annealing furnace is positioned between the draw furnace and the gas distribution assembly. Moreover, the optical fiber production system includes a fiber collection unit positioned along the draw pathway, and the gas distribution assembly is positioned between the annealing furnace and the fiber collection unit.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Reference will now be made in detail to embodiments of methods and systems for producing optical fibers, examples of which are illustrated in the accompanying drawings. Whenever possible, the same reference numerals will be used throughout the drawings to refer to the same or like parts. More specifically, the methods and systems described herein relate to production of optical fibers, which includes drawing an optical fiber from an optical preform in a draw furnace and annealing the drawn optical fiber in an annealing furnace while inducing laminar gas within a process tube of the annealing furnace, for example, using a gas distribution assembly fluidly coupled to the furnace outlet. Inducing gas flow within the annealing furnace such that gas flow within the process tube of the annealing furnace is laminar may lower the rate of heat transfer away from the optical fiber during annealing, which improves the density uniformity in the optical fiber. Density uniformly may reduce the attenuation of light propagating along the optical fiber, for example, when the optical fiber is used as an optical waveguide. As such, the embodiments described herein describe an improved optical fiber production system having a gas distribution assembly to induce and control gas flow patterns within an annealing furnace to produce uniformly dense optical fibers. Various embodiments of methods and systems for producing optical fibers will be described herein with specific reference to the appended drawings.

Figure 1:
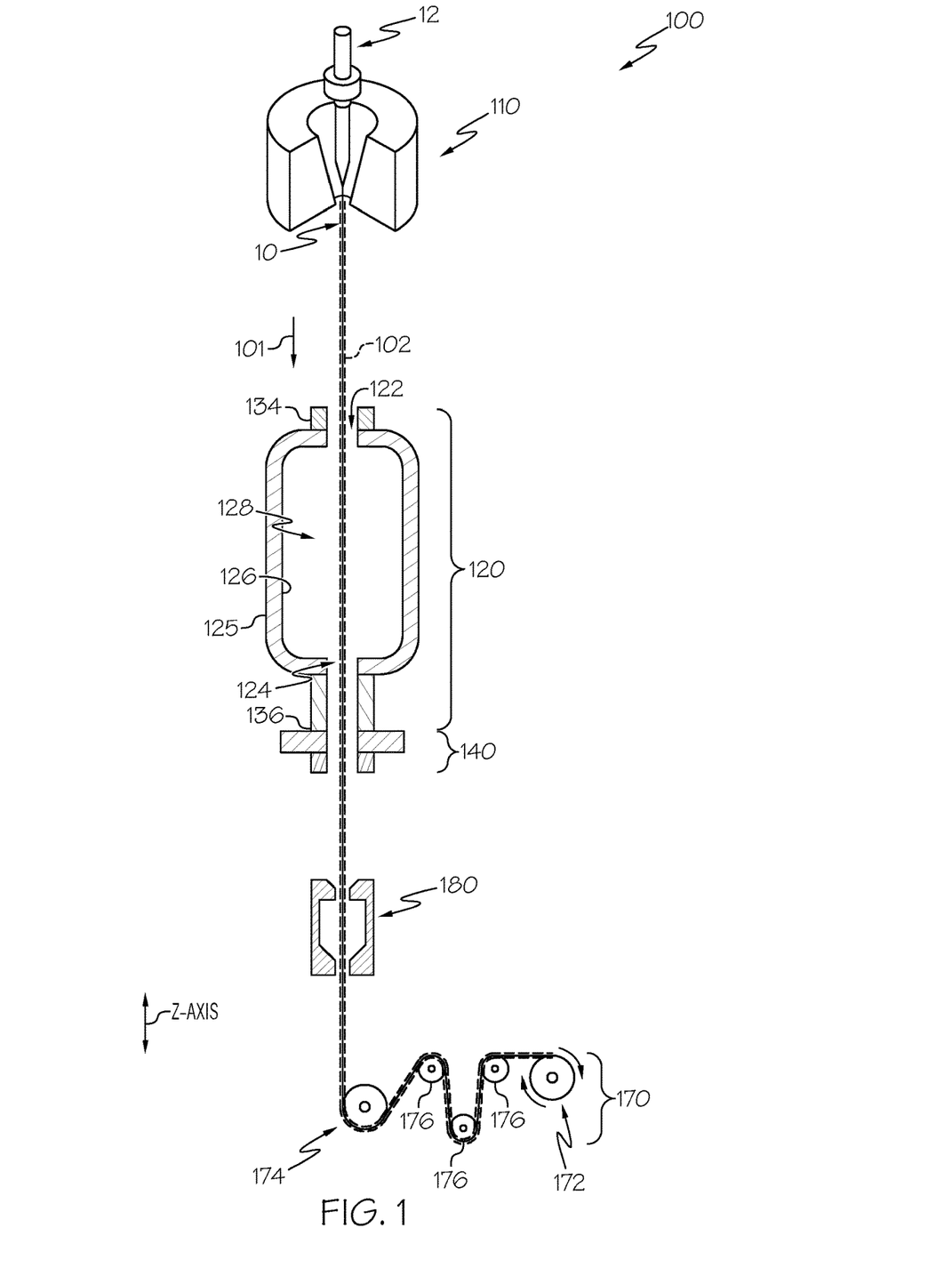
FIG. 1 is a schematic illustration of an optical fiber production system, according to one or more embodiments described herein.

Referring now to FIG. 1, an optical fiber production system 100 configured to produce an optical fiber 10 is schematically depicted. The optical fiber production system 100 comprises a draw furnace 110, an annealing furnace 120, a gas distribution assembly 140, a fiber collection unit 170, and a fiber coating unit 180. As depicted in FIG. 1, a draw pathway 102 extends from the draw furnace 110 to the fiber collection unit 170 and is the pathway along which an optical fiber 10 travels during production, for example, in a draw direction 101. As depicted in FIG. 1, an optical fiber preform 12 is placed in the draw furnace 110. The optical fiber preform 12 may be constructed of any glass or material suitable for the manufacture of optical fibers.

In operation, the draw furnace 110 may heat the optical fiber preform 12 such that the optical fiber 10 may be drawn from the optical fiber preform 12. The draw furnace 110 may be oriented along the draw pathway 102, which may be a vertical pathway, such that the optical fiber 10 drawn from the optical fiber preform 12 exits the draw furnace 110 along the draw pathway 102 in the draw direction 101, which may be a downward direction. By orienting the draw furnace 110 in a vertical direction, the optical fiber 10 may be drawn from the optical fiber preform 12 by the weight of the optical fiber preform 12 as the optical fiber preform 12 softens due to the temperature of the draw furnace 110 and, in some embodiments, by tension applied to the optical fiber 10, and thereby applied to the optical fiber preform 12, by the fiber collection unit 170.

Figure 2:
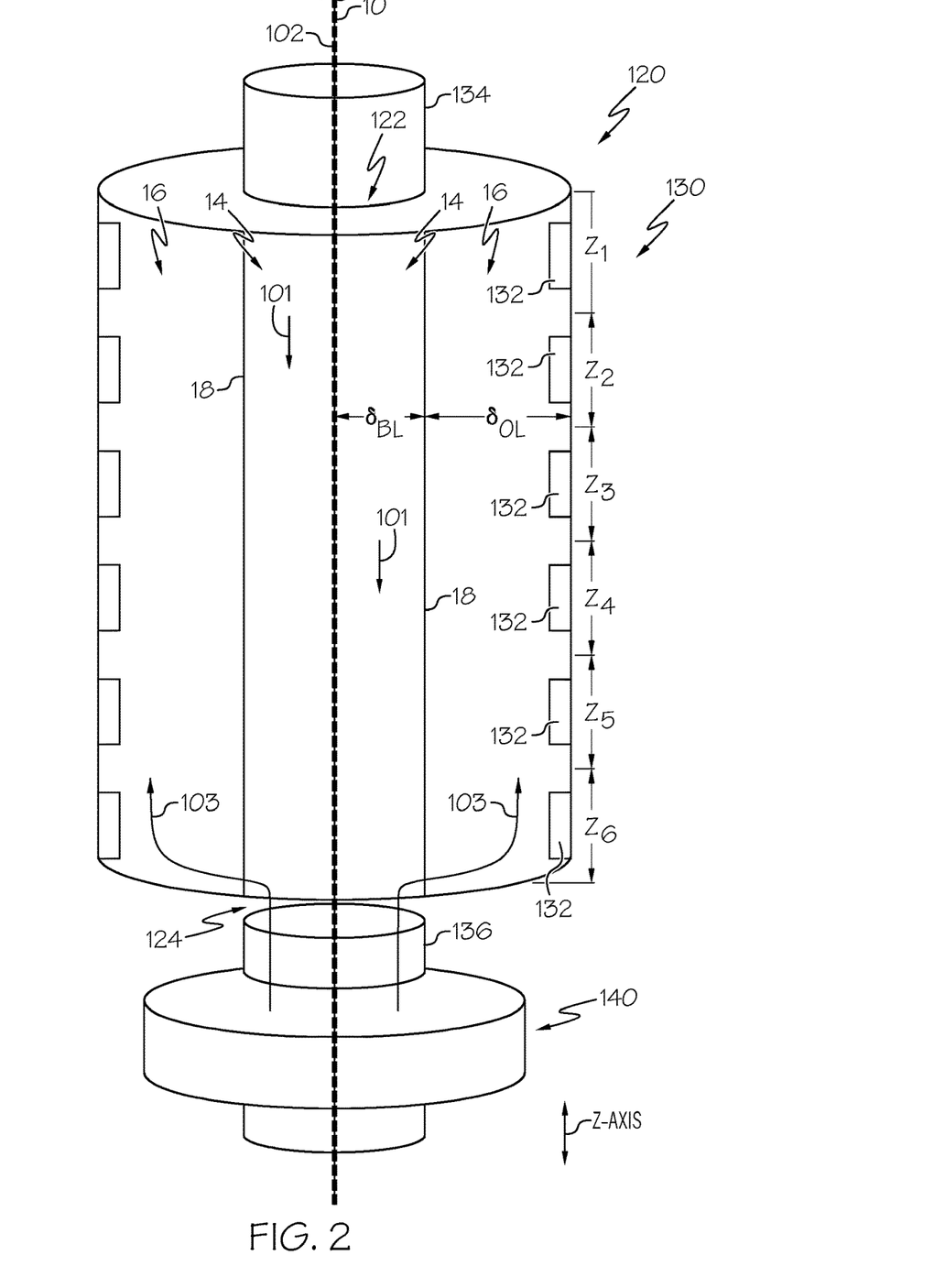
FIG. 2 is a schematic illustration of an annealing furnace and a gas distribution assembly of the optical fiber production system of FIG. 1, according to one or more embodiments described herein.

Referring now to FIGS. 1 and 2, once the optical fiber 10 is drawn from the optical fiber preform 12 and exits the draw furnace 110, the optical fiber 10 enters the annealing furnace 120. The annealing furnace 120 comprises a furnace inlet 122 and a furnace outlet 124. The draw pathway 102 extends through the annealing furnace 120, for example, through the furnace inlet 122 and the furnace outlet 124. The annealing furnace 120 includes a process tube 125 having a process tube wall 126 bounding a process tube cavity 128. In operation, the optical fiber 10 drawn from the optical fiber preform 12 may traverse the annealing furnace 120, traveling from the furnace inlet 122, through the process tube 125 to the furnace outlet 124. While not intending to be limited by theory, passing the optical fiber 10 through the annealing furnace 120 to slow its cooling rate (when compared to the cooling rate of the optical fiber 10 in the external atmosphere) may improve the density uniformity in the optical fiber 10. Further, a uniformly dense optical fiber 10 may have reduced attenuation due to decreased Rayleigh scattering when the optical fiber 10 is used as a light waveguide.

As depicted in FIGS. 1 and 2, the annealing furnace 120 may further comprise a furnace inlet channel 134 and a furnace outlet channel 136. The furnace inlet channel 134 is fluidly coupled to the furnace inlet 122 such that the optical fiber 10 traverses the furnace inlet channel 134 before entering the process tube 125 via the furnace inlet 122. Further, the furnace inlet channel 134 extends from the furnace inlet 122 away from the process tube 125 and comprises a length of from about ¼ inch to about 5 inch, for example, ½ inch, 1 inch, 1.5 inch, 2 inch, 2.5 inch, 3 inch, 3.5 inch, 4 inch, 4.5 inch, or the like. Further, the furnace inlet channel 134 may comprise a cross-sectional dimension (e.g., diameter) of from about ⅛ inch to about 1 inch, for example, about ¼ inch, ⅜ inch, ⅓ inch, ½ inch, ⅝ inch, ⅔ inch, ¾ inch, ⅞ inch, or the like. In some embodiments, the furnace inlet channel 134 may be physically coupled to the process tube 125 at the furnace inlet 122 or integral with the process tube 125. Further, the furnace inlet channel 134 may comprise an insulative material to minimize the effect of the external atmosphere on the temperature within the process tube 125.

Referring still to FIGS. 1 and 2, the furnace outlet channel 136 is fluidly coupled to the furnace outlet 124 and extends from the furnace outlet 124 away from the process tube 125 such that the optical fiber 10 traverses the furnace outlet channel 136 after exiting the process tube 125 via the furnace outlet 124. The furnace outlet channel 136 may be coupled to the process tube 125 at the furnace inlet 122 or integral with the process tube 125. In some embodiments, the furnace outlet channel 136 comprises an insulative material to minimize the effect of the external atmosphere on the temperature within the process tube 125. Further, the diameter of the furnace inlet channel 134 and the furnace outlet channel 136 may be less than a maximum diameter of the process tube 125.

Referring now to FIG. 2, the annealing furnace 120 further comprises a plurality of heating zones 130 positioned in a stacked arrangement between the furnace inlet 122 and the furnace outlet 124. Each heating zone 130 comprises at least one heating element 132 coupled to the process tube wall 126. The heating elements 132 are individually controllable to output different levels of heat, such that, in some embodiments, the heating zones 130 may each comprise a different temperature. In the embodiment depicted in FIG. 2, the annealing furnace 120 comprises six heating zones $Z_1$-$Z_6$, however, it should be understood that any number of heating zones 130 are contemplated.

In operation, the heating elements 132 may generate a temperature within each heating zone 130 of from about 800° C. to about 1500° C. In some embodiments, the heating zone 130 nearest the furnace inlet 122 (e.g., a first heating zone $Z_1$) may comprise a higher temperature than the remaining heating zones 130 and the heating zone nearest the furnace outlet 124 (e.g., a sixth heating zone $Z_6$) may comprise a lower temperature than the remaining heating zones 130. In other words, the temperature within the process tube 125 decreases along the draw pathway 102 from the furnace inlet 122 to the furnace outlet 124 such that the temperature of the optical fiber 10 decreases as the optical fiber 10 traverses the process tube 125 between the furnace inlet 122 and the furnace outlet 124 in the draw direction 101, facilitating slow cooling of the optical fiber 10. In other embodiments, the temperature of the heating zones 130 may not necessarily decrease along the draw pathway 102 in the draw direction 101, however, in each embodiment, the temperature of the optical fiber 10 decreases as the optical fiber 10 traverses the process tube between the furnace inlet 122 and the furnace outlet 124 in the draw direction 101.

Referring still to FIG. 2, as the optical fiber 10 traverses the process tube 125 along the draw pathway 102, a gas boundary layer 14 is generated around the optical fiber 10 within the process tube cavity 128 and comprises gas flowing primarily in the draw direction 101. The gas boundary layer 14 extends radially from the optical fiber 10 toward the process tube wall 126, terminates at a gas layer interface 18, and comprises a gas boundary layer thickness $\delta_{BL}$. While not intending to be limited by theory, the gas boundary layer 14 is formed from drag generated by motion of the optical fiber 10 in the draw direction 101. As depicted in FIG. 2, the furnace inlet channel 134 may comprise a diameter approximately equal to a cross-sectional diameter of the gas boundary layer 14 (e.g., twice the gas boundary layer thickness $\delta_{BL}$), for example, from about 0.4 cm to about 0.8 cm, such as 0.5 cm, 0.55 cm, 0.6 cm, 0.65 cm, 0.7 cm, 0.75 cm, or the like. Without intending to be limited by theory, having a furnace inlet channel 134 with a diameter approximately equal to the cross-sectional diameter of the gas boundary layer 14 may limit the amount of turbulent gas flow within the process tube 125, for example, may limit turbulent gas flow in the draw direction 101 within the gas boundary layer 14.

Further, an outer gas layer 16 is positioned radially adjacent to the gas boundary layer 14 in the process tube 125 (e.g., within the process tube cavity 128). The outer gas layer 16 extends from the gas boundary layer 14 to the process tube wall 126 (e.g., from the gas layer interface 18 to the process tube wall 126), and comprises an outer layer thickness $\delta_{OL}$. The outer gas layer 16 may comprise gas introduced into the process tube 125 from the gas distribution assembly 140 that flows primarily in an upflow direction 103, which may be opposite the draw direction 101. As described below, by inducing gas flow in the upflow direction 103 within the outer gas layer 16, laminar flow may be maintained in both the gas boundary layer 14 and the outer gas layer 16. This stable, laminar flow decreases the rate of heat transfer away from the optical fiber 10 (i.e. the "optical fiber heat transfer rate") when the optical fiber 10 is traversing the process tube 125. Moreover, decreasing the optical fiber heat transfer rate promotes uniform density in the optical fiber 10.

While not intending to be limited by theory, when the gas boundary layer 14 becomes unstable (e.g., turbulent), eddy currents may form in the gas boundary layer 14, which increases the optical fiber heat transfer rate. Further, when the outer gas layer 16 becomes unstable (e.g., turbulent), eddy currents may form in the outer gas layer 16, which also increases the optical fiber heat transfer rate. As such, it is desirable to induce gas flow in the outer gas layer 16 in the upflow direction 103 such that both the gas boundary layer 14 and the outer gas layer 16 comprise laminar flow. In operation, if the flow rate of gas in the upflow direction 103 in the outer gas layer 16 is too small (or nonexistent), the gas boundary layer 14 (and in some embodiments the outer gas layer 16) may become turbulent, increasing the optical fiber heat transfer rate. Further, if the flow rate of gas in the upflow direction 103 in the outer gas layer 16 is too large, the outer gas layer 16 may become turbulent, increasing the optical fiber heat transfer rate. However, while not intending to be limited by theory, turbulent flow in the gas boundary layer 14 has a greater effect on the optical fiber heat transfer rate than turbulent flow in the outer gas layer 16.

Further, the optical fiber heat transfer rate at any z-axis location of the optical fiber 10 within the process tube 125 may be a product of a temperature difference between the process tube wall 126 and the optical fiber 10 and a local heat transfer coefficient. This may be mathematically expressed by equation (1):

$$D_f \rho_f C_p \left( v_z \frac{dT}{dz} \right) = -4h(T - T_{wall}),$$

where T is the temperature of the optical fiber 10, $C_p$ is the heat capacity of the optical fiber 10, $D_f$ is the diameter of the optical fiber 10, $v_z$ is the speed that the optical fiber 10 translates along the draw pathway 102 (e.g., the fiber draw speed), $T_{wall}$ is the temperature within the process tube cavity 128 at the process tube wall 126, z is the coordinate of the direction of the draw process (e.g., the draw direction 101), $$\frac{dT}{dz}$$

is the change in the radially-averaged temperature of the fiber in the z direction, $\rho_f$ is the density of the gas in the process tube 125, and h is the heat transfer coefficient. While not intending to be limited by theory, the heat transfer coefficient h measures the efficiency with which heat is transported across the gas boundary layer 14 and the outer gas layer 16 from the optical fiber 10 to the process tube wall 126. Further, when h and $C_p$ are constant, equation (1) may be integrated over the length of the process tube 125 (e.g., the distance along the draw pathway 102 between the furnace inlet 122 and the furnace outlet 124) to get equation (2): ln $$\left( \frac{T_{exit} - T_{PT}}{T_{in} - T_{PT}} \right) = \frac{-4h_{mean}L}{\rho_f v_z C_p D_f},$$

where L is the length of the process tube 125, $T_{in}$ is the temperature of the optical fiber 10 at the furnace inlet 122, $T_{exit}$ is the temperature of the optical fiber 10 at the furnace outlet 124, and $T_{PT}$ is the temperature of the gas in the process tube 125.

Lowering the heat transfer coefficient h lowers the optical fiber heat transfer rate within the process tube 125, which increases the density uniformity of the optical fiber 10. The heat transfer coefficient h (and thereby the optical fiber heat transfer rate) is affected by the flow regime of gas flow in the process tube 125 (e.g., whether the gas flow is laminar or turbulent). In operation, the heat transfer coefficient h is higher when the gas flow within the process tube 125 is turbulent and lower when the gas flow within the process tube 125 is laminar. For example, the optical fiber heat transfer rate may increase by up to a factor of 2 when gas flow within the process tube 125 is turbulent.

As used herein, "flow regime" refers to laminar flow, turbulent flow, or transitional flow, and is determined by the Reynolds number of the gas (e.g., the gas flowing in the process tube 125). The Reynolds number (Re) is a non-dimensional (unitless) ratio of inertial momentum to viscous resistance for the flowing gas. In particular, $$Re = \frac{\text{inertial momentum}}{\text{viscous resistance}} = \frac{\rho v l}{\eta}$$

where ρ is the density of the gas, v is the relative speed of the gas, l is the characteristic linear dimension of the system (e.g., the diameter of the optical fiber 10 or the diameter of the gas boundary layer 14 (e.g., twice the gas boundary layer thickness $\delta_{BL}$), and η is the dynamic viscosity of the gas. While not intending to be limited by theory, the flowing gas comprises a low Reynolds number when in the laminar flow regime, which is characterized by steady, smooth, and viscous flow. Further, the flowing gas comprises a high Reynolds number when in the turbulent flow regime (e.g., a Reynolds number that is higher than the Reynolds number of the laminar regime), which is characterized by unseating, churning, and roiling flow. Moreover, the flowing gas comprises a Reynolds number between the Reynolds number of the laminar regime and the Reynolds number of the turbulent regime when in the transitional flow regime, in which the flowing gas comprises partial laminar flow and partial turbulent flow. While not intending to be limited by theory, when gas flows in both the upflow direction 103 in the process tube 125 (e.g., in the outer gas layer 16) and gas flows in the draw direction 101 in the process tube 125 (e.g., in the gas boundary layer 14) the gas flow within the process tube 125 transitions from turbulent flow at a Reynolds number (in relation to the diameter of the gas boundary layer 14) of less than about 500 and may be fully laminar at a Reynolds number (in relation to the diameter of the gas boundary layer 14) of about 400 or less, 300 or less, 200 or less 100 or less, 50 or less, or the like.

While not intending to be limited by theory, the heat transfer coefficient h is also a function of the thickness $\delta_{BL}$ of the gas boundary layer 14 and the thermal conductivity of the gas flowing in the process tube 125. Further, the thickness $\delta_{BL}$ of the gas boundary layer 14 is affected by the fiber draw speed $v_z$, the amount of time the optical fiber 10 is in the external atmosphere (e.g., the time a portion of the optical fiber 10 is located between the draw furnace 110 and the annealing furnace 120 when traveling along the draw pathway 102), the volume of gas in the gas boundary layer 14 and the outer gas layer 16, the velocity of gas flowing in the gas boundary layer 14 and the outer gas layer 16, and the flow regime of the gas flowing in the gas boundary layer 14 and the outer gas layer 16. Further, the thickness $\delta_{BL}$ of the gas boundary layer 14 within the process tube 125 is a function of a flow rate of gas flowing in the upflow direction 103, the fiber draw speed of the optical fiber 10, the diameter of the flow restriction (e.g., a diameter of an opening 145 in a retractable flow restrictor 142, as described with respect to FIGS. 4 and 5, below), the temperature within the process tube 125, and the flow regime within the process tube 125. Further, stable flow through the process tube 125 (e.g., laminar flow from the furnace inlet 122 to the furnace outlet 124) may induce a constant heat transfer coefficient h through the process tube 125.

Figure 3:
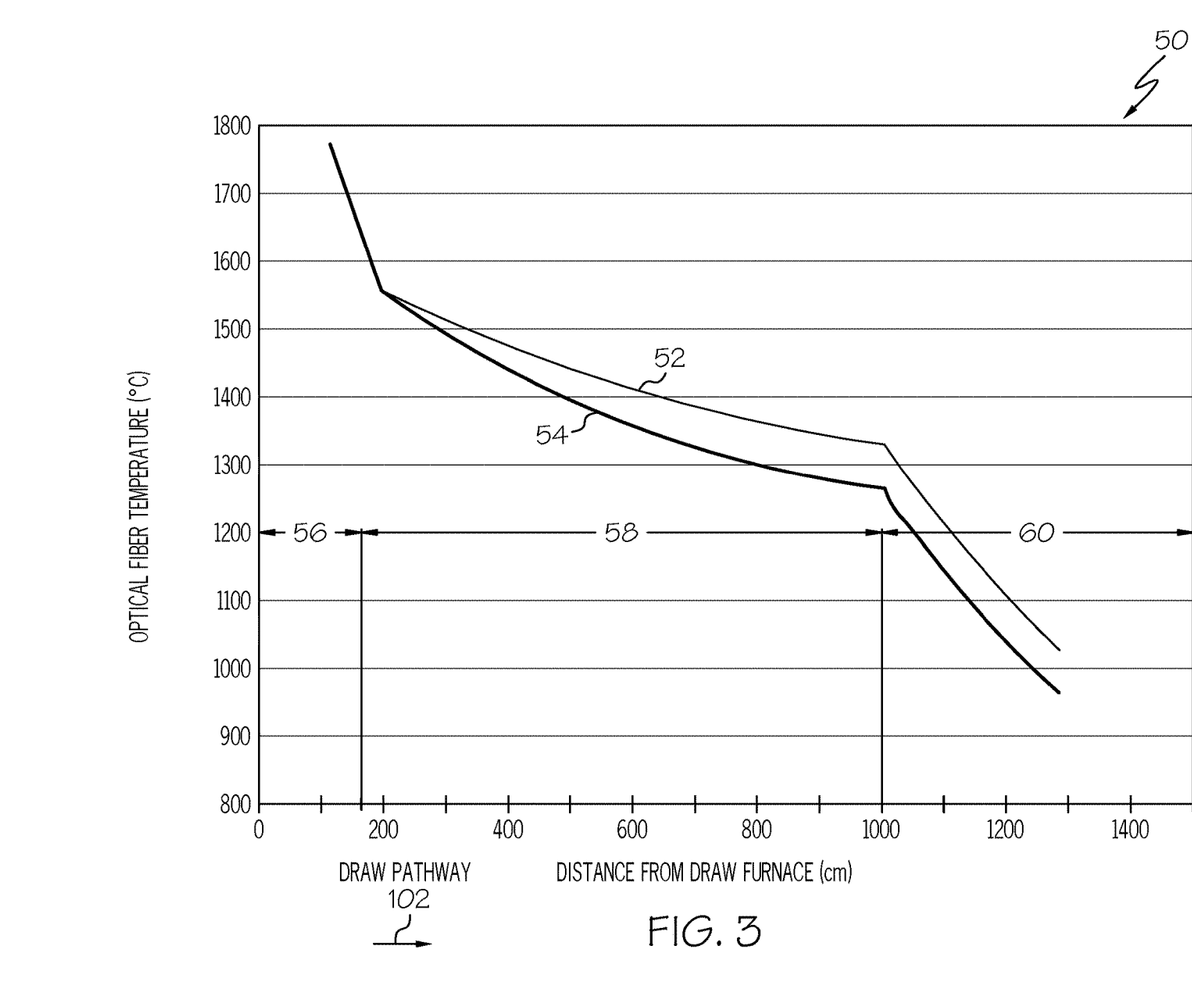
FIG. 3 is a graphical depiction of the temperature of a portion of an optical fiber traveling along a draw pathway, according to one or more embodiments described herein.

Referring now to FIG. 3, a graph 50 depicts the temperature of a portion of the optical fiber 10 traveling along the draw pathway 102 as a function of the distance between the portion of the optical fiber 10 and the draw furnace 110. The graph 50 depicts three regions along the draw pathway 102: region 56, region 58, and region 60. Region 56 is the portion of the draw pathway 102 between the draw furnace 110 and the annealing furnace 120. Region 58 is the portion of the draw pathway 102 within the annealing furnace 120, including the furnace inlet channel 134 and the furnace outlet channel 136. Region 60 is the portion of the draw pathway 102 beyond the annealing furnace 120 (e.g., between the annealing furnace 120 and the fiber collection unit 170). As depicted in FIG. 3, after the optical fiber 10 exits the draw furnace 110, the temperature of the optical fiber 10 continuously decreases. Further, FIG. 3 depicts that the optical fiber heat transfer rate is higher in regions 56 and 60 (e.g., in the external atmosphere) than in region 58 (e.g., in the annealing furnace 120.

Referring still to FIG. 3, line 52 depicts the temperature of the optical fiber 10 along the draw pathway 102 when the process tube 125 of the annealing furnace 120 comprises laminar gas flow and line 54 depicts the temperature of the optical fiber 10 along the draw pathway 102 when the process tube 125 of the annealing furnace 120 comprises turbulent gas flow. As depicted in FIG. 3, the optical fiber heat transfer rate is higher (e.g., the optical fiber 10 cools faster) when the process tube 125 comprises turbulent gas flow than when the process tube 125 comprises laminar gas flow.

In some embodiments, when gas flowing in the process tube 125 is laminar, the heat transfer coefficient h may be from about 400 watts per squared meter kelvin (W/m$^2$-K) to about 600 W/m$^2$-K, for example, 425 W/m$^2$-K, 450 W/m$^2$-K, 475 W/m$^2$-K, 500 W/m$^2$-K, 515 W/m$^2$-K, 525 W/m$^2$-K, 550 W/m$^2$-K, 575 W/m$^2$-K, or the like. In contrast, when gas flowing in the process tube 125 is turbulent, the heat transfer coefficient h may be from about 750 W/m$^2$-K to about 900 W/m$^2$-K, for example, about 775 W/m$^2$-K, 800 W/m$^2$-K, 825 W/m$^2$-K, 850 W/m$^2$-K, 875 W/m$^2$-K, 900 W/m$^2$-K, 925 W/m$^2$-K, or the like.

In one example embodiment, when the optical fiber 10 exits the annealing furnace 120 (e.g., when the optical fiber 10 reaches the furnace outlet 124 or in some embodiments the end of the furnace outlet channel 136) the optical fiber 10 may comprise a temperature that is about 75° C. to about 100° C. lower in turbulent flow than in laminar flow. Moreover, the power required to maintain constant temperature along the draw pathway 102 within the process tube 125 is less when gas flow within the process tube 125 is laminar than when the gas flow in the process tube 125 is turbulent.

In operation, laminar gas flow within the process tube 125 may be achieved by balancing the flow rate of the gas flowing in the draw direction 101 in the gas boundary layer 14 (e.g., the flow induced by drag from the optical fiber 10 translating along the draw pathway 102 through the process tube 125) with gas flowing in the upflow direction 103, for example, in the outer gas layer 16. Gas flowing in the upflow direction 103 may be directed into the process tube 125 using the gas distribution assembly 140, as described in more detail below. Further, while not intending to be limited by theory, the specific flow rate of gas flowing in the upflow direction 103 from the gas distribution assembly 140, that is laminar within the process tube 125, is dependent on the geometries of the furnace inlet channel 134, the furnace outlet channel 136, and the process tube 125, as well as the temperatures of the heating zones 130, the fiber draw speed, and the properties of the gas both flowing from the gas distribution assembly 140 and present in the process tube 125. As one non-limiting example, the flow rate of gas flowing the upflow direction 103 that is laminar within the process tube 125 may be from about 10 standard liters per minute (SLPM) to about 1000 SLPM, for example 20 SLPM, 30 SLPM, 40 SLPM, 50 SLPM, 60 SLPM, 70 SLPM, 80 SLPM, 90 SLPM, or the like.

Referring again to FIGS. 1 and 2 the gas distribution assembly 140 is fluidly coupled to the annealing furnace 120 such that gas may flow from the gas distribution assembly 140 into the annealing furnace 120, for example, into the process tube 125. As depicted in FIGS. 1 and 2, the gas distribution assembly 140 is fluidly coupled to the furnace outlet channel 136, such that the furnace outlet channel 136 is positioned between the gas distribution assembly 140 and the furnace outlet 124 of the annealing furnace 120. Further, in some embodiments, the gas distribution assembly 140 may be physically coupled to the annealing furnace 120 and in other embodiments the gas distribution assembly 140 may be integral with the annealing furnace 120. In operation, the gas distribution assembly 140 may output gas into the annealing furnace 120 to induce gas flow in the process tube 125, for example, laminar gas flow in the outer gas layer 16 in the upflow direction 103, which may be opposite the laminar gas flow flowing in the draw direction 101 in the gas boundary layer 14.

Figure 4:
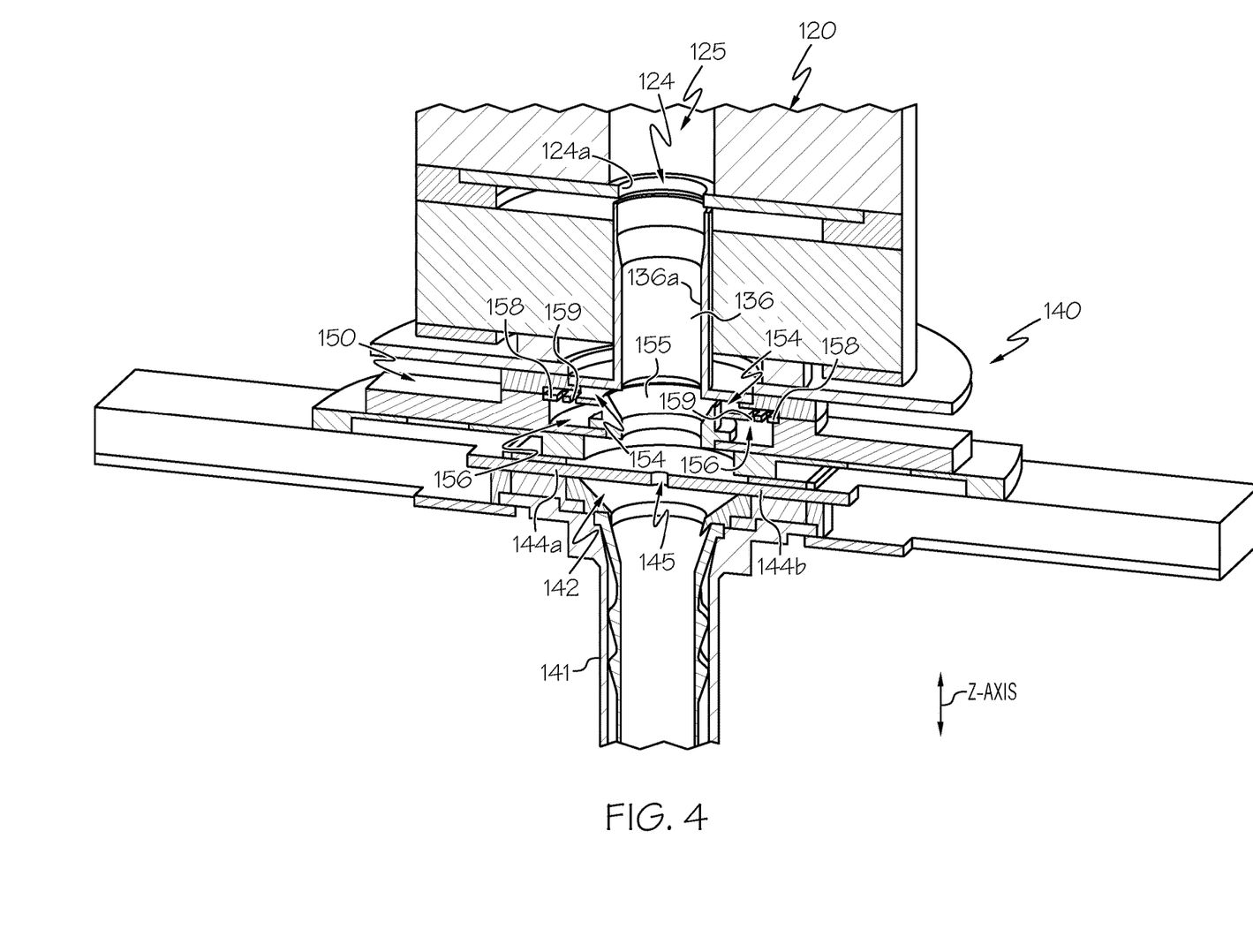
FIG. 4 is a cross-sectional perspective view of a gas distribution assembly, according to one or more embodiments described herein.
Figure 5:
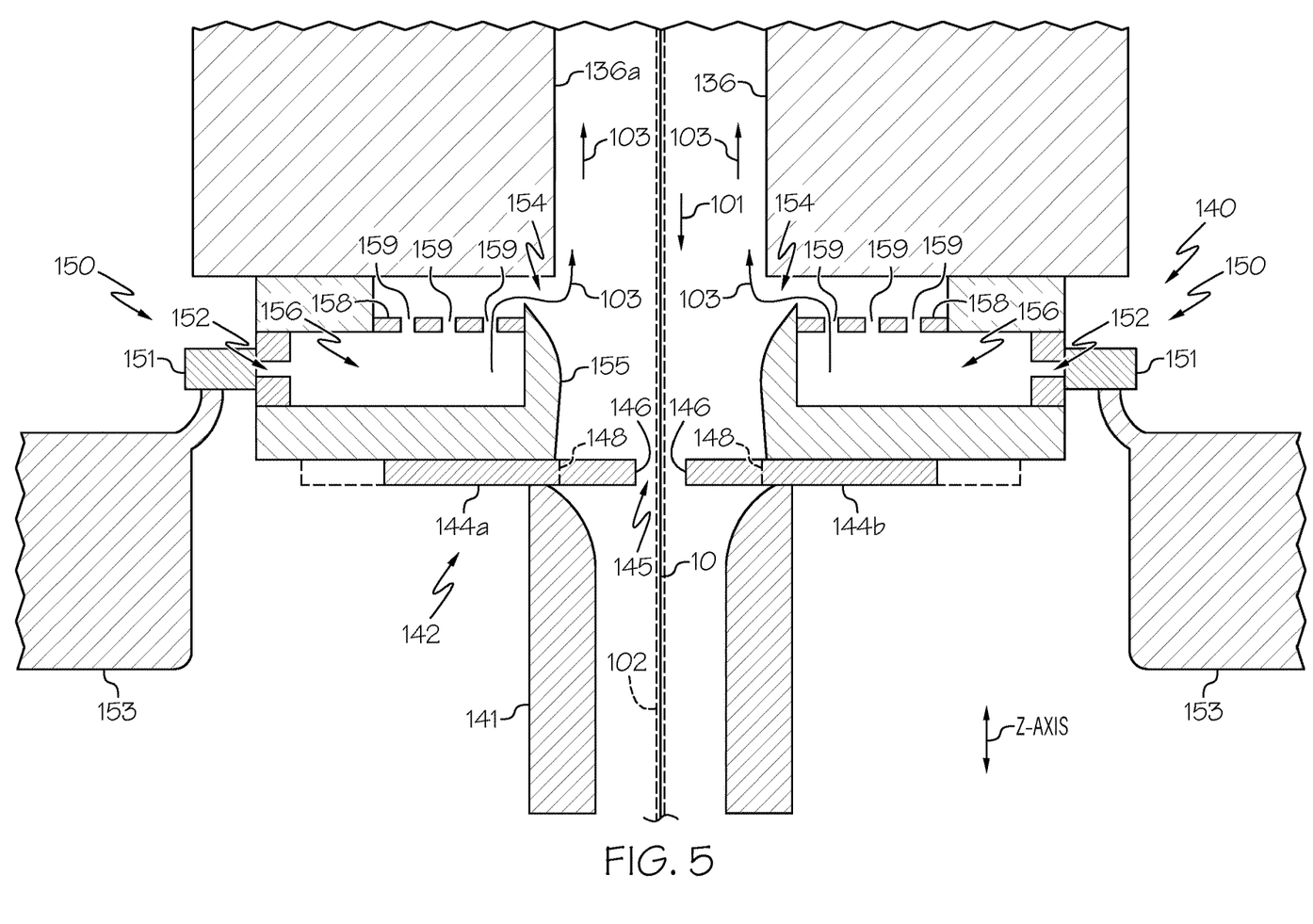
FIG. 5 is a schematic view of a gas distribution assembly, according to one or more embodiments described herein.

Referring now to FIGS. 4 and 5, the gas distribution assembly 140 comprises a gas distribution manifold 150, a retractable flow restrictor 142, and an exit tube 141. The gas distribution manifold 150 is fluidly coupled to the furnace outlet 124 and in some embodiments, physically coupled to the furnace outlet 124 or, as depicted in FIG. 4, physically coupled to the furnace outlet channel 136, which may be positioned between the gas distribution manifold 150 and the furnace outlet 124 to provide a fluid flowpath between the gas distribution manifold 150 and the furnace outlet 124. Further, the gas distribution manifold 150, the retractable flow restrictor 142, and the exit tube 141 are positioned in fluid communication such that the draw pathway 102 extends through each of the gas distribution manifold 150, the retractable flow restrictor 142, and the exit tube 141. In particular, the retractable flow restrictor 142 is positioned between the gas distribution manifold 150 and the exit tube 141 such that after the optical fiber 10 exits the furnace outlet channel 136, the optical fiber 10 traverses the gas distribution manifold 150, the retractable flow restrictor 142, then the exit tube 141. In operation, the gas distribution manifold 150 is structurally configured to output gas into the furnace outlet 124 of the annealing furnace 120 to induce gas flow in the upflow direction 103 in the process tube 125, for example, within the outer gas layer 16 located in the process tube cavity 128 of the process tube 125.

Referring still to FIGS. 4 and 5, the gas distribution manifold 150 comprises a gas manifold inlet 152, a gas manifold outlet 154, and a gas manifold chamber 156 positioned between the gas manifold inlet 152 and the gas manifold outlet 154 such that gas that enters the gas manifold inlet 152 passes through the gas manifold chamber 156 before exiting the gas manifold outlet 154 and entering the process tube 125. In some embodiments, the gas distribution manifold 150 further comprises a manifold restrictor plate 158 comprising one or more flow passages 159 extending therethrough. The manifold restrictor plate 158 is positioned in the gas manifold chamber 156 such that gas that enters the gas manifold inlet 152 may pass through a flow passage 159 of the manifold restrictor plate 158 before reaching the gas manifold outlet 154. In operation, the manifold restrictor plate 158 may uniformly disperse gas flowing from the gas manifold inlet 152 into the gas manifold outlet 154 such that the gas manifold outlet 154 outputs gas radially uniformly into the process tube 125 and in particular, into the outer gas layer 16 located in the process tube cavity 128 of the process tube 125.

Further, the gas distribution manifold 150 comprises a manifold fiber passage 155 extending through the gas distribution manifold 150 to provide an opening for the optical fiber 10 to traverse the gas distribution manifold 150 along the draw pathway 102. As depicted in FIGS. 4 and 5, the gas manifold outlet 154 is positioned between the furnace outlet 124 and the manifold fiber passage 155, for example, between the furnace outlet channel 136 and the manifold fiber passage 155. As depicted in FIGS. 4 and 5, the gas manifold outlet 154 is located radially outward from the draw pathway 102, such that the gas manifold outlet 154 may direct gas flow into the process tube 125 along a perimeter wall 124a of the furnace outlet 124 and in some embodiments, along a perimeter wall 136a of the furnace outlet channel 136 such that gas flowing in the upflow direction 103 into the process tube 125 flows into the outer gas layer 16 housed in the process tube cavity 128 of the process tube 125. For example, in some embodiments, the gas manifold outlet 154 may comprise an annular shape, such as a ring or a disc. By inducing gas flow along the perimeter wall 124a of the furnace outlet 124 (and, in some embodiments, along the perimeter wall 136a of the furnace outlet channel 136), the amount gas flowing in the upflow direction 103 that is subsequently redirected by gas flowing along the draw pathway 102 in draw direction 101 is minimized. Moreover, while the gas manifold outlet 154 depicted in FIGS. 4 and 5, faces radially inward toward the draw pathway 102, in other embodiments, the gas manifold outlet 154 may face upward, in the upflow direction 103.

In operation, the cross sectional area of the gas manifold outlet 154 affects the velocity of gas exiting the gas manifold outlet 154. For example, decreasing the cross-sectional area of the gas manifold outlet 154 increases the velocity of gas exiting the gas manifold outlet 154, which may increase the percentage of that gas that reaches the process tube 125 and flows in the process tube 125 in the upflow direction 103. Further, increasing the velocity of gas exiting the gas manifold outlet 154 may facilitate removal of particulates and fiber shards from the annealing furnace 120 and the gas distribution manifold 150, minimizing the amount of these particulates and fiber shards that become lodged in the annealing furnace 120 and the gas distribution manifold 150.

In operation, the heat of the annealing furnace 120 may induce gas flow through the gas distribution manifold 150 and into the process tube 125 via forced convection upflow. Further, in some embodiments, the gas distribution manifold 150 may comprise one or more mass flow controllers 151 fluidly coupled to the gas manifold inlet 152 of the gas distribution manifold 150 configured to generate gas flow through the gas distribution manifold 150 and into the process tube 125. In operation, the one or more mass flow controllers 151 may induce gas flow in combination with the convection induced gas flow. Further, the one or more mass flow controllers 151 may regulate the flow rate of gas flowing from the gas distribution manifold 150 into the process tube 125.

In some embodiments, alternative gas compositions may be introduced into the gas distribution manifold 150 (and thereby introduced into the process tube 125) by the one or more mass flow controllers 151. As used herein "alternative gas compositions" refer to gas compositions that are different than the gas composition of the external atmosphere in which the gas distribution assembly is located 140. In some embodiments, one or more gas tanks 153 may be fluidly coupled to the one or more mass flow controllers 151 such that the one or more mass flow controllers 151 may introduce a gas housed in the one or more gas tanks 153 (e.g., an alternative gas composition) into the gas distribution manifold 150. However, it should be understood that any method and component for introducing alternative gas compositions into the gas distribution manifold 150 is contemplated.

In some embodiments, it may be desirable to for gas flowing from the gas distribution assembly 140 into the process tube 125 to match the gas already present in the process tube 125 (e.g., the gas housed in the process tube cavity 128). For example, in some embodiments, the process tube cavity 128 may house a noble gas such as argon, which comprises a lower thermal conductivity than air and comprises a heat transfer coefficient h that is about 30% lower than the heat transfer coefficient h of air. In this embodiment, argon may be introduced into the gas distribution manifold 150 by the one or more mass flow controllers 151, thereby maintaining the reduced heat transfer coefficient h of argon within the process tube 125. As an example, the one or more gas tanks 153 may house argon such that gas flowing from the gas distribution manifold 150 into the process tube 125 may comprise argon.

Referring still to FIGS. 4 and 5, the retractable flow restrictor 142 comprises one or more retractable restrictor plates 144 (e.g., a first retractable restrictor plate 144a and a second retractable restrictor plate 144b). The one or more retractable restrictor plates 144 define an opening 145 and the draw pathway 102 extends through the opening 145. The one or more retractable restrictor plates 144 are each translatable between a restricted position 146 and a relaxed position 148. The opening 145 comprises a smaller cross sectional dimension (e.g., diameter) when the one or more retractable restrictor plates 144 are in the restricted positioned 146 than when the one or more retractable restrictor plates 144 are in the relaxed positioned 146. For example, when moving from the restricted position 146 into the relaxed positioned 148 the one or more retractable restrictor plates 144 translate away from the draw pathway 102 and when moving from the relaxed position 148 toward the restricted position 146, the one or more retractable restrictor plates 144 move toward the draw pathway 102.

In operation, the retractable flow restrictor 142 may limit gas flow into the manifold fiber passage 155 and thereby into the furnace outlet channel 136 via the exit tube 141, lowering pressure within the furnace outlet channel 136 to facilitate gas flow from the gas distribution manifold 150 into the process tube 125 (e.g., into the furnace outlet channel 136 then into the process tube 125) and limit gas flow from the opening 145 of the retractable flow restrictor 142 into the process tube 125. Moreover, by restricting gas flow from the opening 145 of the retractable flow restrictor 142 into the process tube 125, the retractable flow restrictor 142 may limit the chimney effect in the process tube 125 and help regulate the flow rate of gas from the gas distribution manifold 150 into the process tube 125. Further, in some embodiments, the gas flow through the process tube 125 may be induced by applying suction to the furnace inlet channel 134 and the amount of gas evacuated through the furnace inlet channel 134 via suction may be monitored by a mass flow meter.

Referring again to FIG. 1, in some embodiments, the optical fiber production system 100 further comprises a fiber coating unit 180 positioned along the draw pathway 102, for example, between the gas distribution manifold 150 and the fiber collection unit 170. The fiber coating unit 180 may apply one or more coating layers to the optical fiber 10 as the optical fiber 10 traverses the fiber coating unit 180. For example, the fiber coating unit 180 may apply one or more of a thermoplastic coating, such as a polyethylene, polypropylene, fluorinated ethylene polypropylene, nylon, polyvinyl chloride or similar thermoplastic material, a UV curable coating, such as a UV-curable acrylate coating, or the like. It should be understood that the fiber coating unit 180 may be any suitable coating unit for applying one or more coatings to an optical fiber as may be presently known in the art or subsequently developed.

Referring still to FIG. 1, after annealing the optical fiber 10 in the annealing furnace 120 and, in some embodiments, after coating the optical fiber in the fiber coating unit 180, the optical fiber 10 may be wound onto a fiber storage spool 172 with a fiber collection unit 170. The fiber collection unit 170 utilizes drawing mechanisms 176 and tensioning pulleys 174 to facilitate winding the optical fiber 10 onto the fiber storage spool 172. The tensioning pulleys 174 may provide the necessary tension to the optical fiber 10 as the optical fiber 10 is drawn through the optical fiber production system 100. Accordingly, the fiber collection unit 170 may directly contact the optical fiber 10 in order to both wind the optical fiber 10 onto fiber storage spool 172 as well as to provide the desired tension on the optical fiber 10 as it is drawn along the draw pathway 102, for example, through the draw furnace 110, the annealing furnace 120, the gas distribution assembly 140, and the fiber coating unit 180.

In view of the foregoing description, it should be understood that the methods and systems of optical fiber production may include a draw furnace for drawing an optical fiber from an optical fiber preform, an annealing furnace for annealing the optical fiber, and a gas distribution assembly for inducing gas flow within a process tube of the annealing furnace, for example, laminar gas flow. Laminar gas flow may lower the rate of heat transfer away from the optical fiber during annealing, improving the density uniformity in the optical fiber and thereby providing an optical fiber having improved attenuation properties. For example, uniform density in optical fibers may minimize the attenuation of light propagating along the optical fiber when the uniformly dense optical fiber is used as an optical waveguide.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber production system comprising:
   an annealing furnace comprising:
      a furnace inlet;
      a furnace outlet; and
      a process tube extending between the furnace inlet and the furnace outlet, the process tube comprising a process tube wall and a heating zone comprising at least one heating element; and
   a gas distribution assembly fluidly coupled to the furnace outlet and structurally configured to induce a gas flow from the gas distribution assembly into the process tube such that the gas flow within the process tube is in an upflow direction.

2. The optical fiber production system of claim 1, wherein:
   the gas distribution assembly comprises a gas distribution manifold and a retractable flow restrictor; and
   the gas distribution manifold is positioned between the retractable flow restrictor and the furnace outlet.

3. The optical fiber production system of claim 2, wherein:
   the gas distribution manifold comprises a gas manifold inlet, a gas manifold outlet, and a gas manifold chamber positioned between and fluidly coupled to the gas manifold inlet and the gas manifold outlet; and
   the gas manifold outlet is fluidly coupled to the furnace outlet.

4. The optical fiber production system of claim 3, wherein:
   the gas distribution manifold further comprises a manifold fiber passage positioned such that a draw pathway extending through the annealing furnace extends though the manifold fiber passage; and
   the gas manifold outlet is positioned between the manifold fiber passage and the furnace outlet of the annealing furnace.

5. The optical fiber production system of claim 3, wherein the gas distribution manifold further comprises a manifold restrictor plate positioned between and fluidly coupled to the gas manifold inlet and the gas manifold outlet, the manifold restrictor plate including a plurality of flow passages extending therethrough.

6. The optical fiber production system of claim 3, wherein the gas distribution manifold further comprises one or more mass flow controllers fluidly coupled to the gas manifold inlet.

7. The optical fiber production system of claim 2, wherein:
   the retractable flow restrictor comprises a first retractable restrictor plate and a second retractable restrictor plate, each translatable between a restricted position and a relaxed position;
   the first retractable restrictor plate and the second retractable restrictor plate define an opening therebetween; and
   a diameter of the opening is larger when the first and second retractable restrictor plates are in the restricted position than when the first and second retractable restrictor plates are in the relaxed position.

8. The optical fiber production system of claim 1, wherein the gas flow in the upflow direction is laminar.

9. The optical fiber production system of claim 1, wherein the annealing furnace further comprises a furnace inlet channel fluidly coupled to the furnace inlet and a furnace outlet channel fluidly coupled to the furnace outlet.

10. The optical fiber production system of claim 9, further comprising an optical fiber situated on a draw pathway extending from the furnace inlet channel to the furnace outlet channel within the process tube, the optical fiber comprising a gas boundary layer, the gas boundary layer comprising a diameter substantially equivalent to a diameter of the furnace inlet channel.

11. The optical fiber production system of claim 1, wherein the gas distribution assembly is structurally configured to induce a flow of the gas flow through the furnace outlet into the process tube in the upflow direction to the furnace inlet.

12. The optical fiber production system of claim 1, wherein the tube wall closes the process tube between the furnace inlet and furnace outlet.

13. A method of inducing gas flow in an annealing furnace, the method comprising:
   translating an optical fiber within an annealing furnace along a draw pathway, the annealing furnace comprising:
      a furnace inlet;
      a furnace outlet; and
      a process tube extending between the furnace inlet and the furnace outlet, the process tube comprising a process tube wall and a plurality of heating zones, each heating zone comprising at least one heating element; and
   inducing a gas flow from a gas distribution assembly fluidly coupled to the furnace outlet into the process tube, the gas flow flowing within the process tube in an upflow direction.

14. The method of claim 13, wherein the gas flow in the upflow direction is laminar.

15. The method of claim 14, wherein the translating induces a gas boundary layer extending radially outward from the optical fiber, the gas boundary layer comprising laminar gas flow in the draw direction.

16. The method of claim 13, wherein the optical fiber is translating along the draw pathway in a draw direction that is opposite the upflow direction.

17. The method of claim 16, wherein the translating induces a gas boundary layer extending radially outward from the optical fiber, the gas boundary layer comprising laminar gas flow in the draw direction.

18. The method of claim 13, wherein the gas flow comprises argon.

19. The method of claim 13, wherein:
   the gas distribution assembly comprises a gas distribution manifold and a retractable flow restrictor;

the gas distribution manifold is positioned between the retractable flow restrictor and the furnace outlet;

the gas distribution manifold comprises a gas manifold inlet, a gas manifold outlet fluidly coupled to the furnace outlet, and a gas manifold chamber positioned between and fluidly coupled to the gas manifold inlet and the gas manifold outlet; and the retractable flow restrictor comprises a first retractable restrictor plate and a second retractable restrictor plate, each translatable between a restricted position and a relaxed position.

20. The method of claim 19, further comprising translating the optical fiber through the gas distribution manifold and the retractable flow restrictor along the draw pathway.

21. An optical fiber production system comprising:
a draw furnace configured to draw an optical fiber from an optical fiber perform along a draw pathway extending from the draw furnace;
an annealing furnace positioned along the draw pathway, wherein the annealing furnace comprises
a furnace inlet;
a furnace outlet; and
a process tube extending between the furnace inlet and the furnace outlet, the process tube comprising a process tube wall and a plurality of heating zones, each heating zone comprising at least one heating element;
a gas distribution assembly positioned along the draw pathway and fluidly coupled to the furnace outlet and structurally configured to induce a gas flow from the gas distribution assembly into the process tube such that the gas flow within the process tube is in an upflow direction, wherein the annealing furnace is positioned between the draw furnace and the gas distribution assembly; and
a fiber collection unit positioned along the draw pathway, wherein the gas distribution assembly is positioned between the annealing furnace and the fiber collection unit.

22. The optical fiber production system of claim 21, wherein:
the gas distribution assembly comprises a gas distribution manifold and a retractable flow restrictor;
the gas distribution manifold is positioned between the retractable flow restrictor and the furnace outlet;
the gas distribution manifold comprises a gas manifold inlet, a gas manifold outlet fluidly coupled to the furnace outlet, and a gas manifold chamber positioned between and fluidly coupled to the gas manifold inlet and the gas manifold outlet; and
the retractable flow restrictor comprises a first retractable restrictor plate and a second retractable restrictor plate, each translatable between a restricted position and a relaxed position.

23. The optical fiber production system of claim 21, wherein the gas flow in the upflow direction is laminar.

24. The optical fiber production system of claim 21, wherein the gas distribution assembly is structurally configured to induce a flow of the gas flow through the furnace outlet into the process tube in the upflow direction to the furnace inlet.

25. The optical fiber production system of claim 21, wherein the tube wall closes the process tube between the furnace inlet and furnace outlet.

* * * * *